(12) United States Patent
Wu et al.

(10) Patent No.: US 9,755,493 B2
(45) Date of Patent: Sep. 5, 2017

(54) LINEAR MOTOR AND STAGE APPARATUS

(71) Applicant: SHANGHAI MICRO ELECTRONICS EQUIPMENT CO., LTD., Shanghai (CN)

(72) Inventors: Liwei Wu, Shanghai (CN); Qingsheng Chen, Shanghai (CN); Lanzhou Yan, Shanghai (CN)

(73) Assignee: SHANGHAI MICRO ELECTRONICS EQUIPMENT (GROUP) CO., LTD., Shanghai (CN)

( * ) Notice: Subject to any disclaimer, the term of this patent is extended or adjusted under 35 U.S.C. 154(b) by 319 days.

(21) Appl. No.: 14/408,130

(22) PCT Filed: Jul. 2, 2013

(86) PCT No.: PCT/CN2013/078671
§ 371 (c)(1),
(2) Date: Dec. 15, 2014

(87) PCT Pub. No.: WO2014/019438
PCT Pub. Date: Feb. 6, 2014

(65) Prior Publication Data
US 2015/0137624 A1    May 21, 2015

(30) Foreign Application Priority Data

Jul. 31, 2012   (CN) .......................... 2012 1 0270584
Dec. 7, 2012    (CN) .......................... 2012 1 0525941

(51) Int. Cl.
*H02K 41/02*    (2006.01)
*H02K 41/03*    (2006.01)

(52) U.S. Cl.
CPC .................. *H02K 41/031* (2013.01)

(58) Field of Classification Search
CPC ... H02K 41/03; H02K 41/031; H02K 41/0356
(Continued)

(56) References Cited

U.S. PATENT DOCUMENTS

2004/0100153 A1* 5/2004 Korenaga ........... G03F 7/70716
310/12.19
2004/0246458 A1  12/2004 Hol et al.
(Continued)

FOREIGN PATENT DOCUMENTS

CN       101783574 A     7/2010
CN       101931307 A    12/2010
(Continued)

*Primary Examiner* — Thanh Lam
(74) *Attorney, Agent, or Firm* — Muncy, Geissler, Olds & Lowe, P.C.

(57) ABSTRACT

A linear motor includes a magnet unit and a coil unit. The magnet unit includes two magnet arrays oppositely parallel and symmetrically located on a magnetic yoke: a first and a second magnet array. The coil unit is disposed in a magnetic gap between the two magnet arrays. In a spatial rectangular coordinate system defined by X, Y and Z axes, the coil unit includes a first and a second coil array arranged in a stacked manner in the Z-axis direction and staggered from each other by a distance of ΔP in the Y-axis direction. ΔP satisfies: when a control system charges the coil unit with a desired current, the coil unit generates a control force along the Y-axis direction, another control force along the Z-axis direction, and a moment about the X-axis direction, which may reduce a magnetic flux leakage and provide higher driving forces, making the linear motor generate required three degrees-of-freedom control force or control torque, and further improve vertical and horizontal magnetic fluxes in the magnet array.

18 Claims, 8 Drawing Sheets

(58) Field of Classification Search
USPC .................. 310/12.05, 12.19, 12.21–12.22
See application file for complete search history.

(56) References Cited

U.S. PATENT DOCUMENTS

| | | | |
|---|---|---|---|
| 2010/0090545 A1* | 4/2010 | Binnard | .................. H02K 1/17 310/12.05 |
| 2010/0167556 A1* | 7/2010 | Totsu | ..................... H02K 41/03 438/795 |
| 2010/0264755 A1 | 10/2010 | Widdowson et al. | |
| 2010/0295385 A1 | 11/2010 | Hsu et al. | |

FOREIGN PATENT DOCUMENTS

| | | |
|---|---|---|
| CN | 102185458 A | 9/2011 |
| JP | 04-33564 A | 2/1992 |

* cited by examiner

LINEAR MOTOR AND STAGE APPARATUS

TECHNICAL FIELD

The present invention relates to the field of photolithography, and in particular, to a linear motor and a stage apparatus.

BACKGROUND

With the improvement of photolithographic technology and the rapid development of semiconductor industry, the performance of a photolithographic apparatus can be assessed on the four fundamental characteristics, i.e., critical dimension (CD) uniformity, focal-depth or focus accuracy, overlay accuracy, and throughput. In order to improve the critical dimension uniformity, a wafer or a mask stage needs to improve its horizontal positioning precision. In order to improve the focal-depth accuracy, the wafer or mask stage needs to improve its vertical positioning precision. In order to improve the overlay accuracy, the wafer or mask stage needs to have an improved internal model which can enhance its dynamic positioning characteristics. In addition, considering the photolithographic apparatus is generally required to increase its throughput, the stage should also possess the capabilities of high-speed movement and rapid start and stop. The high-speed, high-acceleration and high-precision-positioning requirements of the photolithographic apparatus are conflicting. To increase the scanning speed necessitates more powerful motor capable of not only large-stroke and high-speed movement but also movement in multiple degrees of freedom for enabling lithographic exposure and alignment.

Photolithographic apparatuses can be generally categorized into two types. One is steppers, in which, a mask pattern is entirely exposed onto one of the target portions of a wafer at one exposure, and the wafer is then moved relative to the mask to locate the next target portion right under the mask pattern and a projection objective, where the mask pattern is exposed on the next target portion of the wafer. This process is repeated until the mask pattern is formed on each target portion of the wafer. The other is scanners, in which, the mask pattern is not formed at one exposure. Instead, the mask pattern is formed by the scanning and movement of a projection field. During the imaging of the mask pattern, the mask and the wafer are simultaneously moved relative to the projection beam and projection system.

Each of the above described photolithographic apparatuses employs a means to hold the mask/wafer, and it is the precise relative movement of the means for holding the mask/wafer that ensures the requirements for the photolithographic process to he satisfied. The means for holding the mask is called a mask stage, and the means for holding the wafer is called a wafer stage.

Figure 1:
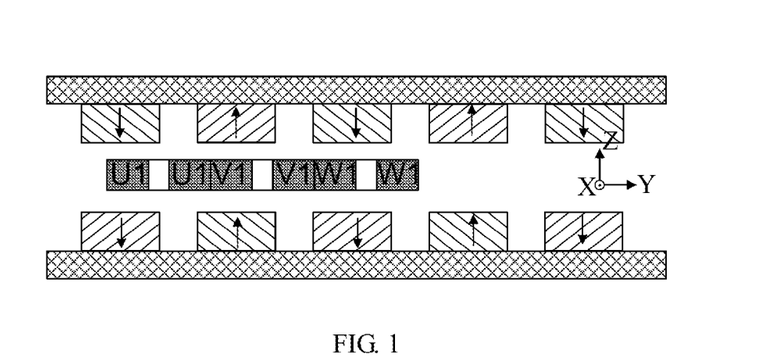
FIG. 1 shows a linear motor that uses conventional NS magnet arrays and a single-layered coil array.

Turning now to FIG. 1, which shows a linear motor that uses conventional NS magnet arrays and a single-layered coil array.

U.S. Pat. Pub. No. 20040246458A1 discloses a linear motor for a wafer or mask stage of a photolithographic apparatus. The linear motor has a high driving force, high efficiency and low normal force, and includes a first magnet plate, a second magnet plate arranged in parallel and opposite to the first magnet plate, and an armature, which includes three open coil units, interposed between the first and second magnet plates. The first and second magnet plates and the coil units are relatively movable. The use of two opposed magnet plates and an open coil unit which does not include an iron core enables volume reduction of the motor without additional heat generation for an increase in the force output. Since this design leads to additional effective magnet material and hence higher magnetic forces, efficiency of the motor can be increased with the number of used bearings and the moving mass being both reduced, thus rendering the motor particularly useful in vacuum environments. However, as the reference has not considered the ripple force that may be caused by tilt or other factors, this motor is still incapable of satisfactory precision positioning of the stage. Moreover, the used laterally aligned cuboid-shaped magnets may cause magnetic flux leakage at the magnetic yoke and thus precision control difficulties and insufficient control forces. Therefore, there is a need for a novel positioning motor of higher-precision and a linear motor which is more powerful.

Further, with the improvement of photolithographic technology and the rapid development of semiconductor industry, the performance of a photolithographic apparatus can be assessed on the four fundamental characteristics, i.e., critical dimension (CD) uniformity, focal-depth or focus accuracy, overlay accuracy, and throughput. In order to improve the critical dimension uniformity, a wafer or a mask stage needs to improve its horizontal positioning precision. In order to improve the focal-depth accuracy, the wafer or mask stage needs to improve its vertical positioning precision. In order to improve the overlay accuracy, the wafer or mask stage needs to have an improved internal model which can enhance its dynamic positioning characteristics. In addition, considering the photolithographic apparatus is generally required to increase its throughput, the stage should also possess the capabilities of high-speed movement and rapid start and stop. The high-speed, high-acceleration and high-precision-positioning requirements of the photolithographic apparatus are conflicting, and to increase its scanning speed requires more powerful motors. In order to address this contradiction, the existing wafer stage technologies adopt both coarse and fine motion systems, so as to decouple the high-speed requirement from the high-precision requirement. Usually, the coarse-motion system is mostly realized by a linear motor which can enable large-stoke and high-speed movement, while the fine-motion system is generally mounted on top of the coarse-motion system, for dynamically compensating positional deviations. The fine-motion system is generally capable of a precision on the nanometer order and can move in multiple degrees of freedom to implement required photolithographic exposure and alignment tasks. However, since such structure currently adopts an air-bearing-based drive technology, it is not able to achieve the reconciliation of multiple-degree-of-freedom movement and actuator integration. This results in a large moving mass of the system and hence a large driving force, as well as significant residual vibration caused by a proportionally large reaction force to the driving force which is detrimental to the system's dynamic performance. In addition, considering that a high throughput requires the system to have a high acceleration which will cause a large additional tilting moment, the air suspension means for the wafer stage is generally designed to be subject to high static stiffness constraints, thus imposing extremely high requirements on guide surface planarity, preload deformation and air suspension parameters. Furthermore, after equipped with electrical, gas, liquid and vacuum passages, the motor case and other supporting components, the wafer stage system will become complex, huge, lack of reliability and difficult for maintenance.

A linear motor can drive a load to make a translational movement without needing the aid of any mechanical conversion means. Therefore, the linear motor is free of errors caused by deformation, backlash, or other factors of the conversion means, and has a relatively small inertia. A Halbach array is a novel arrangement of permanent magnets, in which the magnets having different directions of magnetization are arranged in a certain order such that the magnetic field on one side of the array is significantly augmented while the field on the other side is significantly canceled out. Therefore, it is easy for the Halbach array to form a desirable sinusoidally distributed spatial magnetic field and the array has thus found extensive application in linear motors due to its beneficial characteristics.

Kim W. J. of the Massachusetts Institute of Technology (MIT) describes in his PhD thesis, entitled "Precision Planar Magnetic Levitation", published in 1997, a high-precision positioning stage system based on four Halbach array linear motors which cooperate to enable six-degree-of-freedom motions needed in photolithography. The system operates with a positioning noise of 5 nm and acceleration capabilities in excess of 1 g (9.8 m/s$^2$). In addition, Williams of MIT also describes in his PhD thesis, entitled "Precision six-degree-of-freedom magnetically levitated photolithography stage", a high-precision positioning stage having a hybrid drive system composed of Halbach array linear motors and electromagnets.

U.S. Pat. Pub. No. 20040246458A1 published on Dec. 9, 2014 discloses a linear motor for a wafer or mask stage of a photolithographic apparatus. The linear motor has a high driving force, high efficiency and low normal force, and includes a first magnet plate, a second magnet plate arranged in parallel and opposite to the first magnet plate, and an armature, which includes three open coil units, interposed between the first and second magnet plates. The first and second magnet plates and the coil units are relatively movable. The use of two opposed magnet plates and an open coil unit which does not include an iron core enables volume reduction of the motor without additional heat generation for an increase in the force output. Since this design leads to additional effective magnet material and hence higher magnetic forces, efficiency of the motor can be increased with the number of used bearings and the moving mass being both reduced, thus rendering the motor particularly useful in vacuum environments.

However, in the Halbach arrays of the two linear motors described above, an inconsistency of in-plane magnetic flux density distribution profile and geometric profile of the magnetic arrays will limit their vertical and horizontal magnetic fluxes. These limitations will lead to limited vertical and horizontal magnetic flux density as well as limited vertical and horizontal driving forces and hence limited driving forces in the six degrees of freedom.

SUMMARY OF THE INVENTION

It is therefore an objective of the present invention to reduce magnetic flux leakage and provide higher driving forces to enable the construction of a linear motor that can provide desirable control forces or moments in three degrees of freedom. It is therefore a further objective of the present invention to provide a linear motor which can create more continuous magnetic lines of force and hence augmented vertical and horizontal magnetic fluxes in magnet array.

In pursuit of these objectives, according to a first aspect, the invention provides a linear motor which includes a magnet unit and a coil unit. The magnet unit includes a first magnet array and a second magnet array arranged on a magnetic yoke, symmetrically and in parallel to each other. The coil unit is disposed in a magnetic gap formed between the first and second magnet arrays. In addition, in a spatial rectangular coordinate system defined by X, Y and Z axes, the coil unit includes a first coil array and a second coil array arranged in a stacked manner in the Z-axis direction and the first and second coil arrays are staggered from each other by a distance of ΔP in the Y-axis direction, and ΔP is so set that when the coil unit is provided with a desired electrical current from a control system, the coil unit generates a first control force along the Y-axis direction, a second control force along the Z-axis direction, and a moment about the X-axis direction.

In one embodiment, the first and second coil arrays include a same number of coils each having a coil pitch of CP, where the number is greater than two. In addition, in the X-axis direction, the first coil array is staggered from the second coil array by a distance of ΔP that equals to ¼ CP.

In one embodiment, each of the first and second magnet arrays is composed of first-type magnets, second-type magnets and third-type magnets arranged along the Y-axis direction in a similar periodically alternating manner of a Halbach array, each of the third-type magnets being interposed between a corresponding one of the first-type magnets and an adjacent one of the second-type magnets. Additionally, the first-type magnets and second-type magnets are arranged along the Y-axis direction in an alternating and equidistant manner, each of the third-type magnets is a one-piece unitary prismatic magnet or includes three prismatic magnets, when each of the third-type magnets is a one-piece unitary prismatic magnet, each pair of adjacent magnets has oblique abutting side faces, and when each of the third-type magnets comprises three prismatic magnets, each pair of adjacent ones of the three prismatic magnets has oblique abutting side faces. Furthermore, each set of one of the third-type magnets, the adjacent one of the first-type magnets and the adjacent one of the second-type magnets, of one of the first and second magnet arrays, jointly forms a closed magnetic circuit with a corresponding set of the other symmetrical one of the first and second magnet arrays.

In one embodiment, each of the first-type and second-type magnets assumes a shape of a cuboid. Additionally, each of the first-type and second-type magnets has a magnetization direction parallel to the Z-axis direction, and the magnetization direction of each of the first-type magnets is opposite to the magnetization direction of each of the second-type magnets. Moreover, each of the third-type magnets includes a first prismatic magnet, a second prismatic magnet and a third prismatic magnet, and the three prismatic magnets are able to form, as a whole, a cuboid that is the same high as the first-type and second-type magnets. In addition, each of the first, second and third prismatic magnets is in a shape of a triangular or quadrangular prism; and wherein a path along magnetization directions of the first, second and third prismatic magnets advances, from the first prismatic magnet, through the abutting faces of the first and second prismatic magnets, into the second prismatic magnet, further through the abutting faces of the second and third prismatic magnets and further into the third prismatic magnet, or reversely, from the third prismatic, magnet, through the abutting faces of the third and second prismatic magnets, into the second prismatic magnet, further through the abutting faces of the second and first prismatic magnets and further into the first prismatic magnet, so that each set of one of the third-type magnets, the adjacent one of the first-type magnets and the adjacent one of the second-type magnets, of one of the first and second magnet arrays, jointly forms a closed magnetic circuit with a corresponding set of the other symmetrical one of the first and second magnet arrays.

In one embodiment, the first, second and third prismatic magnets have cross sections in a Y-Z plane in shapes of a right triangle, an isosceles triangle and a right triangle, respectively, or the first, second and third prismatic magnets have cross sections in the Y-Z plane in shapes of a right trapezoid, an isosceles triangle and a right trapezoid, respectively.

In one embodiment, each of the first-type magnets has the same lengthwise and widthwise dimensions with each of the second-type magnets, and the first-type, second-type and third-type magnets all have the same height.

In one embodiment, the first, second and third prismatic magnets have cross sections in a Y-Z plane in shapes of a right triangle, an isosceles trapezoid and a right triangle, respectively.

In one embodiment, the cross sections of the first and third prismatic magnets have cross sections in the Y-Z plane in shapes of right trapezoids sharing a common side.

In one embodiment, angles of the abutting side faces with respect to the Z axis are determined by sizes and shapes of the first, second and third prismatic magnets.

In one embodiment, wherein each of the third-type magnets is a one-piece unitary prismatic magnet, and each of the first-type, second-type and third-type magnets has a cross section in a Y-Z plane in a shape of an isosceles trapezoid. Additionally, each of the first-type and second-type magnets has a magnetization direction parallel to the Z-axis direction, and the magnetization direction of each of the first-type magnets is opposite to the magnetization direction of each of the second-type magnets. Further, each of the third-type magnets has a magnetization direction parallel to the Y-axis direction and points toward the adjacent first-type or second-type magnet, so that each set of one of the third-type magnets, the adjacent one of the first-type magnets and the adjacent one of the second-type magnets, of one of the first and second magnet arrays, jointly forms a closed magnetic circuit with a corresponding set of the other symmetrical one of the first and second magnet arrays.

In one embodiment, cross sections of the first-type, second-type and third-type magnets in the Y-Z plane are isosceles trapezoids having a same length of slant sides, a same base angle and a same height.

According to a second aspect, the invention provides a stage apparatus which includes a stage and two support legs disposed on opposing ends of the stage. The stage is provided with a driving force in the Y-axis direction and a levitation force in the Z-axis direction from motors arranged on tops of the respective support legs. Each of the motors is the linear motor described above.

In one embodiment, at least one of the support legs is provided on top thereof with a guide means for providing guidance for movement of the stage in the Y-axis direction, and the guide means includes an air slide coupled to the stage and a guide rail secured to at least one of the support legs. The air slide is disposed on a side of the guide rail facing toward the stage.

In one embodiment, the air slide is a flexible block.

In the linear motor and stage apparatus of this invention, the coil unit includes a first coil array and a second coil array arranged in a stacked manner in the Z-axis direction and the first and second coil arrays are staggered from each other by a distance of ΔP in the Y-axis direction, and ΔP is so set that when the coil unit is provided with a desired electrical current from a control system, the coil unit generates a control force along the Y-axis direction, another control force along the Z-axis direction, and a moment about the X-axis direction. Arranging the first and second coil arrays into two separate layers enables the generation of a desirable vertical levitation force, and staggering the two layers of the coil arrays by a certain distance from each other can provide a desirable control moment with ripple force that may be caused by tilt or other factors being canceled out to eliminate any torsional moment, thus achieving precision positioning. Further, by incorporating the linear motor, the stage apparatus is capable of providing a driving force in a certain horizontal direction and a vertical levitation force, with a simple structure not including any air levitation mechanism, as well as easy operations.

Additionally, in the linear motor and stage apparatus of this invention, each of the first and second magnet arrays is composed of first-type magnets, second-type magnets and third-type magnets arranged along the Y-axis direction in a similar periodically alternating manner of a Halbach array, each of the third-type magnets being interposed between a corresponding one of the first-type magnets and an adjacent one of the second-type magnets; the first-type magnets and second-type magnets are arranged along the Y-axis direction in an alternating and equidistant manner; each of the third-type magnets is a one-piece unitary prismatic magnet or comprises three prismatic magnets, when each of the third-type magnets is a one-piece unitary prismatic magnet, each pair of adjacent magnets has oblique abutting side faces, and when each of the third-type magnets comprises three prismatic magnets, each pair of adjacent ones of the three prismatic magnets has oblique abutting side faces, and wherein each set of one of the third-type magnets, the adjacent one of the first-type magnets and the adjacent one of the second-type magnets, of one of the first and second magnet arrays, jointly forms a closed magnetic circuit with a corresponding set of the other symmetrical one of the first and second magnet arrays. Compared to the conventional NS array with a uniform magnetic energy product, the Halbach topology in which the first and second magnet arrays are both arranged into a similar periodically alternating configuration as that of a Halbach array enables the magnet unit to have an augmented vertical magnetic flux and hence increased horizontal magnetic flux density and driving force, as well as an augmented horizontal magnetic flux and hence increased vertical magnetic flux density and driving force. This allows the motor to generate higher driving forces in six degrees of freedom. Further, the use of prismatic magnets, for example, triangular or quadrangular prismatic magnets, in the magnet arrays enables the construction of a Halbach array with less magnetic flux leakage, more uniform spatial flux density distribution, reduced high-order harmonic amplitude in in-plane flux density and a smaller mass, compared to the conventional magnet arrays.

DETAILED DESCRIPTION

The present invention will be described in greater detail in the following description which demonstrates preferred embodiments of the invention, in conjunction with the accompanying drawings. Those of skill in the art should, in light of the present disclosure, appreciate that many changes can be made in the specific embodiments disclosed herein and still obtain the same beneficial results. Therefore, the following description should be construed as the illustrative of the principles of the present invention, and not providing limitations thereto.

For simplicity and clarity of illustration, not all features of the specific embodiments are described. Additionally, descriptions and details of well-known functions and structures are omitted to avoid unnecessarily obscuring the present invention. The development of any specific embodiment of the present invention includes specific decisions made to achieve the developer's specific goals, such as compliance with system related and business related constraints, which will vary from one embodiment to another. Moreover, such a development effort might be complex and time consuming but would nevertheless be a routine undertaking for those of ordinary skill in the art.

The following embodiments serve to illustrate, with reference to the accompanying drawings, the present invention in more detail. Features and advantages of the invention will be apparent from the following detailed description, and from the appended claims. Note that the accompanying drawings are provided in a very simplified form not necessarily presented to scale, with the only intention of facilitating convenience and clarity in explanation.

Embodiment 1

Figure 2:
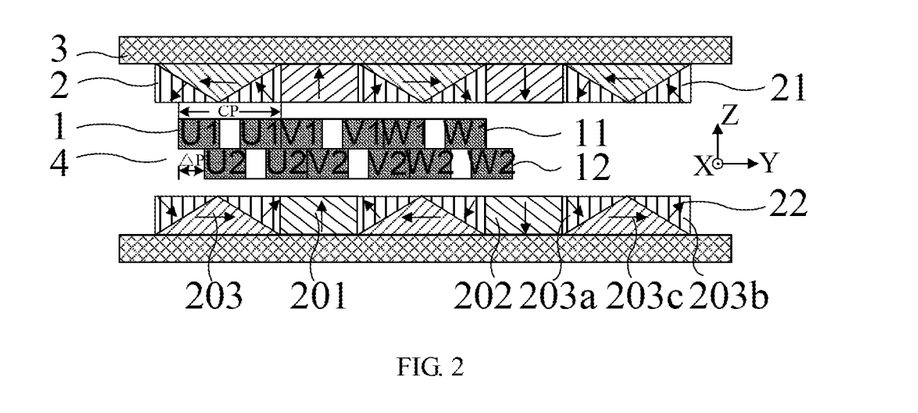
FIG. 2 schematically illustrates a linear motor in accordance with embodiment 1 of the present invention.
Figure 3:
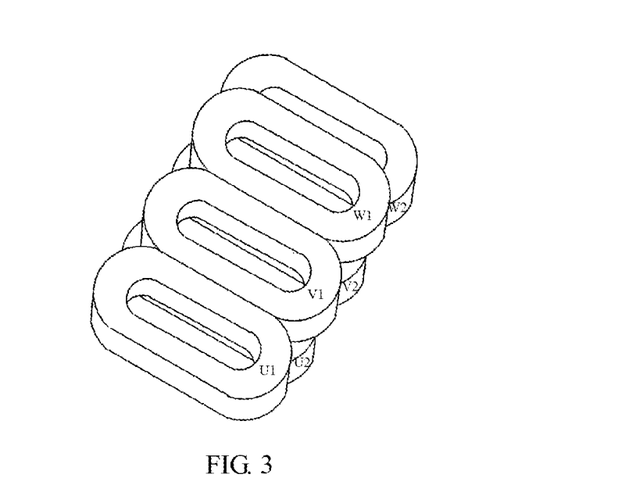
FIG. 3 shows a coil unit in accordance with embodiment 1 of the present invention, which includes two coil arrays arranged into two separate layers and staggered from each other.

Referring to FIG. 2, a linear motor constructed in accordance with this embodiment includes a magnet unit 2, a coil unit 1, a magnet fixing member 3, i.e., a magnetic yoke and a control system (not shown). The magnet fixing member 3 appears U-shaped, when viewed from one side of the linear motor (i.e., the XZ plane in this embodiment), and serves to support the magnet unit 2. The magnet unit 2 includes two magnet arrays, a first magnet array 21 and a second magnet array 22, arranged on the magnetic yoke, symmetrically and in parallel to each other. In other words, the magnet unit 2 includes the first and second magnet arrays 21 and 22 which are respectively arranged on the parallel inner walls of the magnet fixing member 3. The coil unit 1 is disposed in a magnetic gap 4 formed between the two magnet arrays, i.e., disposed in a magnetic gap 4 formed between the first and second magnet arrays 21 and 22, and the control system is configured to supply an electrical current to the coil unit 1. The first and second magnet arrays 21 and 22 are both arranged in a similar periodically alternating configuration as that of a Halbach array along the Y-axis direction, as shown in FIG. 3. The coil unit 1 includes a first coil array 11 and a second coil array 12, which are arranged in a stacked manner in the Z-axis direction, and the first coil array 11 and the second coil array 12 are staggered from each other by a distance of ΔP in the Y-axis direction. ΔP is so set that when the coil unit 1 is provided with a certain current from the control system, it will generate a. control force along the Y-axis direction, another control force along the Z-axis direction, and a moment about the X-axis direction. On one hand, arranging the first and second coil arrays 11 and 12 into two separate layers can generate a desirable vertical levitation force (i.e., along the Z-axis direction in this embodiment). On the other hand, staggering the two layers of the coil arrays from each other by a certain distance can provide a desirable control moment with ripple force that may be caused by tilt or other factors being canceled out to eliminate any torsional moment, thus achieving precision positioning. Further, arranging magnets of each of the first and second magnet arrays 21 and 22 of the magnet unit 2 in a periodically alternating manner to resemble a Halbach array enables the construction of a Halbach topology that provides a higher vertical magnetic flux and hence a correspondingly larger horizontal driving force, compared to the conventional NS magnet array with a uniform magnetic energy product.

Preferably, the first and second coil arrays 11 and 12 include the same number of coils each having a coil pitch (i.e., the width of the coil in the Y-axis direction) of CP, wherein the number is greater than two. The first coil array 11 may be staggered from the second coil array 12, in the X-axis direction, by a distance of ΔP that is ⅛~⅓ CP. In this embodiment, it is desirable that ΔP is set as ¼ CP, on the ground that each magnet array is configured as a linear Halbach array with a magnetic field distribution characterized in that there is a delay in phase of 90 degrees, i.e., ¼ cycle, between its horizontal and vertical sinusoidal magnetic fields, and staggering the two coil arrays by ¼ CP can thus make the force-generating phases in each cycle of the two sinusoidal magnetic fields exactly match each other. Of course, the coil pitch may be set as other values according to different magnet-unit magnetic field distributions and specific application needs.

Figure 4:
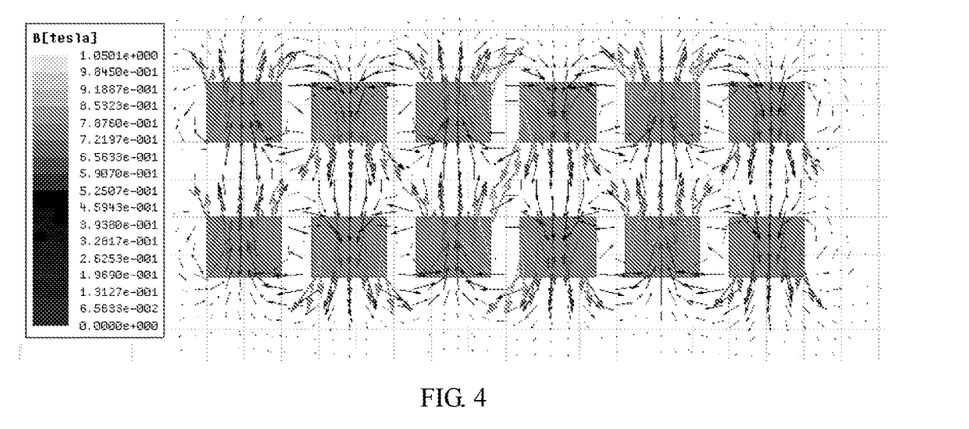
FIG. 4 depicts a magnetic flux density distribution created by a magnet unit constituted by the conventional NS magnet arrays of the linear motor of FIG. 1.
Figure 5:
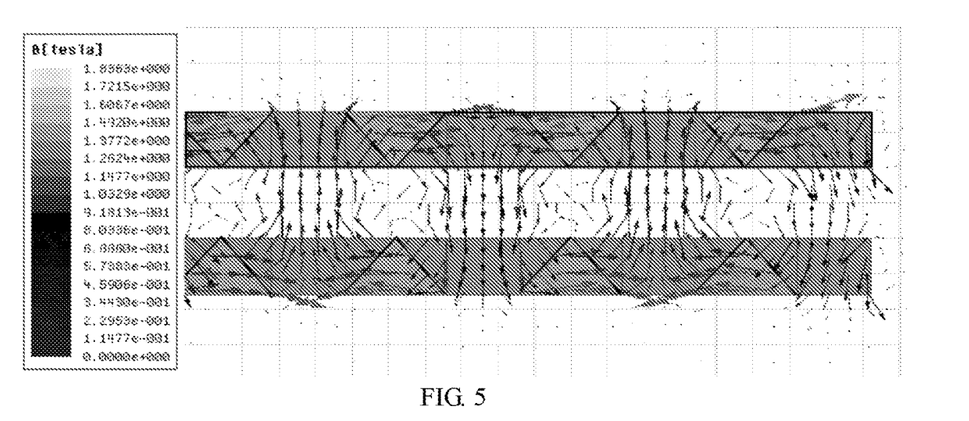
FIG. 5 depicts a magnetic flux density distribution of a magnet unit in accordance with embodiment 1 of the present invention.

FIG. 4 depicts a magnetic flux density distribution of a magnet unit constituted by conventional NS magnet arrays, while FIG. 5 shows a magnetic flux density distribution formed by the magnet unit in according with embodiment 1 of the present invention. By comparing FIG. 4 and FIG. 5 we can see that, the maximum magnetic flux density B of the conventional NS magnet arrays is 1.0501 tesla, while the maximum magnetic flux density B of the Halbach array (i.e., the magnet unit comprised of the first and second magnet arrays 21 and 22, each being arranged into a similar periodically alternating configuration as a Halbach array) in accordance with embodiment 1 of the present invention is 1.8363 tesla, which shows a significant increase in the amplitude of magnetic flux density. Note that an improved magnetic flux density distribution which better resembles a standard sinusoid can be obtained by making proper adjustments in magnet array size.

Figure 6:
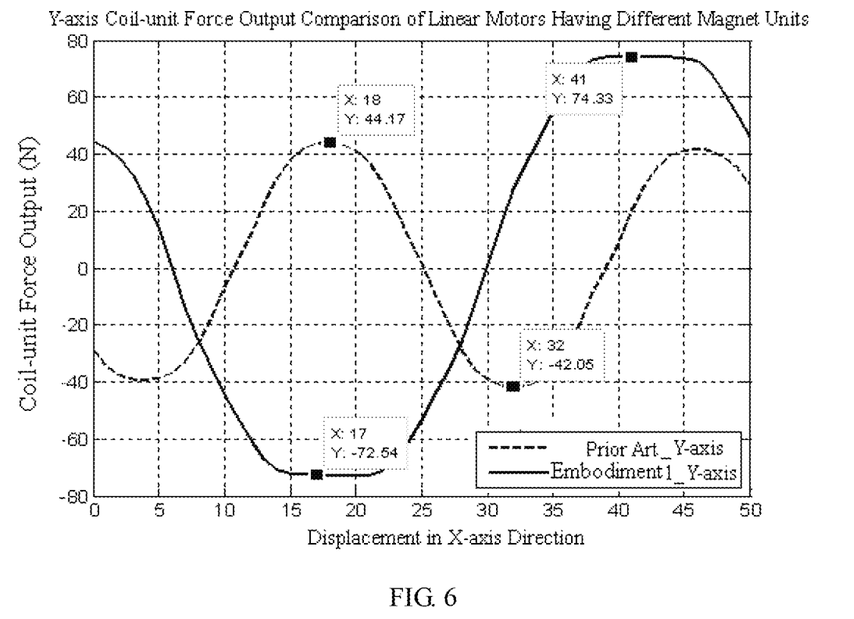
FIG. 6 shows a Y-axis coil-unit force output comparison of the linear motors of FIGS. 1 and 2.
Figure 7:
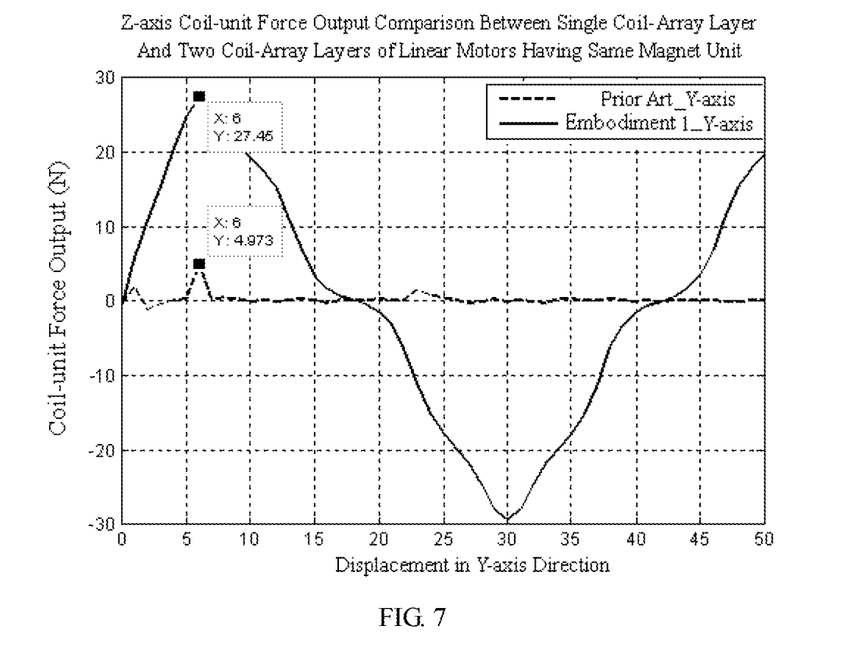
FIG. 7 shows a Z-axis coil-unit force output comparison of the linear motor in accordance with embodiment 1 of the present invention and a linear motor having the same magnet unit but a coil unit constituted by a single-layered coil array.

FIG. 6 shows a Y-axis coil-unit force output comparison between the linear motors of FIGS. 1 and 2, while FIG. 7 shows a Z-axis coil-unit force output comparison between structures employing a single-layered coil array and a two-layered coil array in accordance with embodiment 1 of the present invention. As can be seen from FIG. 6, the coil-unit force output of the conventional NS magnet arrays is in a range of −42.05~44.17 N, while the coil-unit force output of the Halbach array in accordance with embodiment 1 is in a range of −72.54~74.33 N, which shows that the Halbach array in accordance with embodiment 1 of the present invention achieves a great increase in the amplitude of the coil-unit force output, compared to the prior art. As can be seen from FIG. 7, a peak value of the coil-unit force output of a single-layered coil array employed in embodiment 1 is 4.973 N, while a peak value of the coil-unit force output of the two-layered coil array of embodiment 1 is 27.45 N, which shows that the two-layered coil array in accordance with embodiment 1 of the present invention achieves a great increase in the amplitude of the coil-unit force output in the Z-axis direction, compared to the conventional single-layered coil array.

Preferably, each of the first and second magnet arrays 21 and 22 of the above-mentioned linear motor is composed of first-type magnets 201, second-type magnets 202 and third-type magnets 203 arranged along the Y-axis direction in a similar periodically alternating manner of a Halbach array. Each of the third-type magnets is interposed between a corresponding first-type magnet and an adjacent second-type magnet. The first-type magnets 201 and second-type magnets 202 are arranged along the Y-axis direction in an alternating and equidistant manner, and each of the third-type magnets 203 is a one-piece unitary prismatic magnet or includes three prismatic magnets. Moreover, when each of the third-type magnets 203 is a one-piece unitary prismatic magnet, each pair of adjacent magnets of different types has oblique abutting side faces, and when each of the third-type magnets 203 includes three prismatic magnets, each pair of adjacent ones of these three prismatic magnets has oblique abutting side faces. Further, each set of a third-type magnet 203 and the adjacent first-type magnet and second-type magnet, of one magnet array, jointly forms a closed magnetic circuit with a corresponding set of the other symmetrical magnet array.

Each of the first-type magnets 201 assumes a rectangular shape, in other words, each of the first-type and second-type magnets 201 and 202 is in the shape of a cuboid. In addition, each of the first-type and second-type magnets 201 and 202 has a magnetization direction that is parallel to the Z-axis direction, and the magnetization direction of each first-type magnet is opposite to that of each second-type magnet. The magnetization direction of each of the first-type magnets 201 may point toward either the positive side of the Z-axis or the opposite, negative side thereof. In this embodiment, the magnetization direction of each of the first-type magnets 201 points toward the Z-axis. Each of the third-type magnets 203 includes a first prismatic magnet 203a, a second prismatic magnet 203b and a third prismatic magnet 203c. When brought together, the three prismatic magnets 203a, 203b and 203c can form, as a whole, a cuboid that is the same high as the first-type and second-type magnets 201 and 202. Each of the first-type magnets measures the same as each of the second-type magnets both in the lengthwise direction (i.e., the X-axis direction in this embodiment) and in the widthwise direction (i.e., the Y-axis direction in this embodiment), and the first-type, second-type and third-type magnets all have the same height (i.e., the dimension in the Z-axis direction in this embodiment).

In each of the third-type magnets 203, the pairs of adjacent prismatic magnets have oblique abutting side faces, i.e., the pair of first and second prismatic magnets 203a and 203b and the pair of the second and third prismatic magnets 203b and 203c, both have oblique abutting side faces. Additionally, each of the first, second and third prismatic magnets 203a, 203b and 203c is in the shape of a triangular or quadrangular prism. As such, a path along the magnetization directions of the first, second and third prismatic magnets 203a, 203b and 203c advances, from the first prismatic magnet 203a, through the abutting faces of the first and second prismatic magnets 203a and 203b, into the second prismatic magnet 203b, further through the abutting faces of the second and third prismatic magnets 203b and 203c and further into the third prismatic magnet 203c, or reversely, from the third prismatic magnet 203c, through the abutting faces of the third and second prismatic magnets 203c and 203b, into the second prismatic magnet 203h, further through the abutting faces of the second and first prismatic magnets 203b and 203a and further into the first prismatic magnet 203a. As a result, each set of a third-type magnet 203 and the adjacent first-type magnet 201 and second-type magnet 202, of one magnet array, jointly forms a closed magnetic circuit with a corresponding set of the other symmetrical magnet array.

In this embodiment, compared to the conventional NS array with a uniform magnetic energy product, the Halbach topology in which the first and second magnet arrays 21 and 22 are both arranged into a periodically alternating configuration resembling a Halbach array enables the magnet unit 2 to have an augmented vertical magnetic flux and hence increased horizontal magnetic flux density and driving force, as well as an augmented horizontal magnetic flux and hence increased vertical magnetic flux density and driving force. This allows the motor to generate higher driving forces in six degrees of freedom.

In this embodiment, the above-mentioned first-type magnets 201 and second-type magnets 202 are all quadrangular prismatic magnets, while each of the third-type magnets 203 is comprised of triangular magnets and/or quadrangular prismatic magnets. Compared to the conventional magnet arrays, the Halbach array comprised of triangular magnets and/or quadrangular prismatic magnets has less magnetic flux leakage, more uniform spatial flux density distribution, reduced high-order harmonic amplitude in in-plane flux density and a smaller mass.

Preferably, in the above-mentioned linear motor, the first, second and third prismatic magnets 203a, 203b and 203c have cross sections in the Y-Z plane in the shapes of a right triangle, an isosceles triangle and a right triangle, respectively.

Preferably, in the above-mentioned linear motor, angles of the abutting side faces with respect to the Z axis are determined by sizes and shapes of the first, second and third prismatic magnets 203a, 203b and 203c. In other words, the angle of the abutting side faces of the first and second prismatic magnets 203a and 203b relative to the Z axis and the angle of the abutting side faces of the second and third prismatic magnets 203b and 203c relative to the Z axis are equal to each other and are both determined by sizes and shapes of the first, second and third prismatic magnets 203a, 203b and 203c. In this embodiment, each abutting face forms an angle of about 135° with the +Z-axis direction. In other words, the magnetization direction of the first prismatic magnet 203a points toward the second prismatic magnet 203b and forms an angle of about 135° with the +Z-axis direction; the magnetization direction of the second prismatic magnet 203b is parallel to the Y-axis direction and points toward the adjacent first-type magnet 111; and the magnetization direction of the third prismatic magnet 203c points away from the second prismatic magnet 203b and forms an angle of about 45° with the +Z-axis direction.

Figure 8:
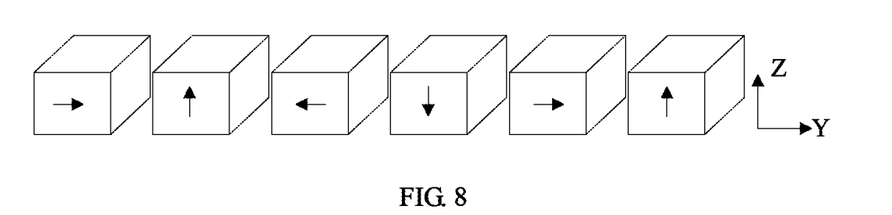
FIG. 8 is a three-dimensional schematic view of a conventional magnet array.
Figure 9:
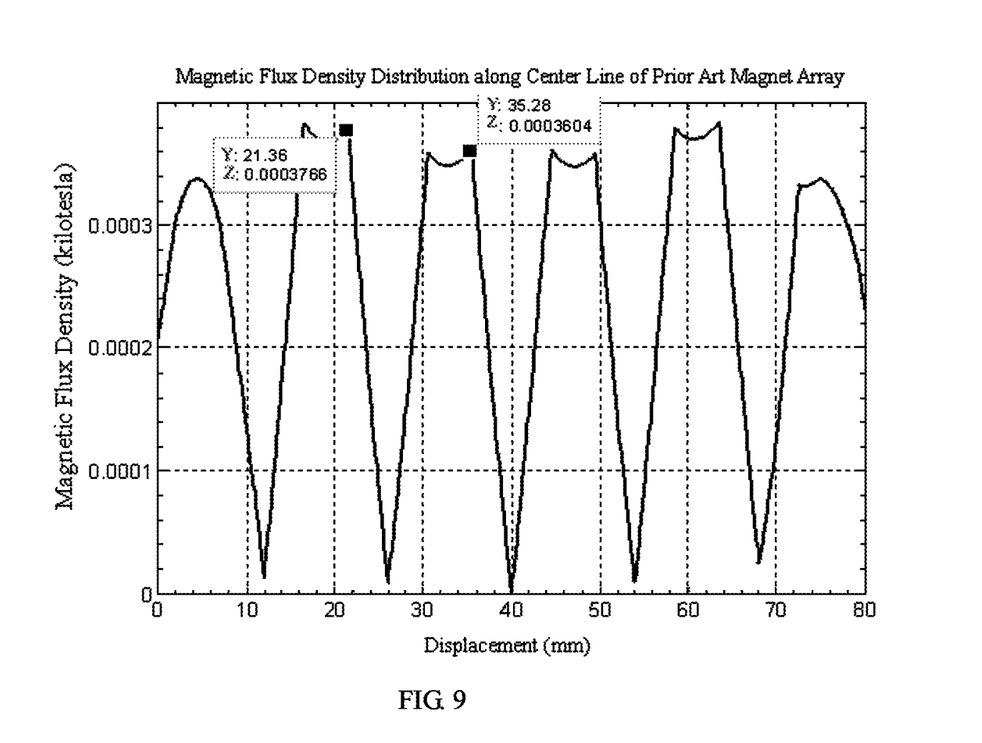
FIG. 9 shows a magnetic flux density distribution along a center line of the magnet array of FIG. 8.
Figure 10:
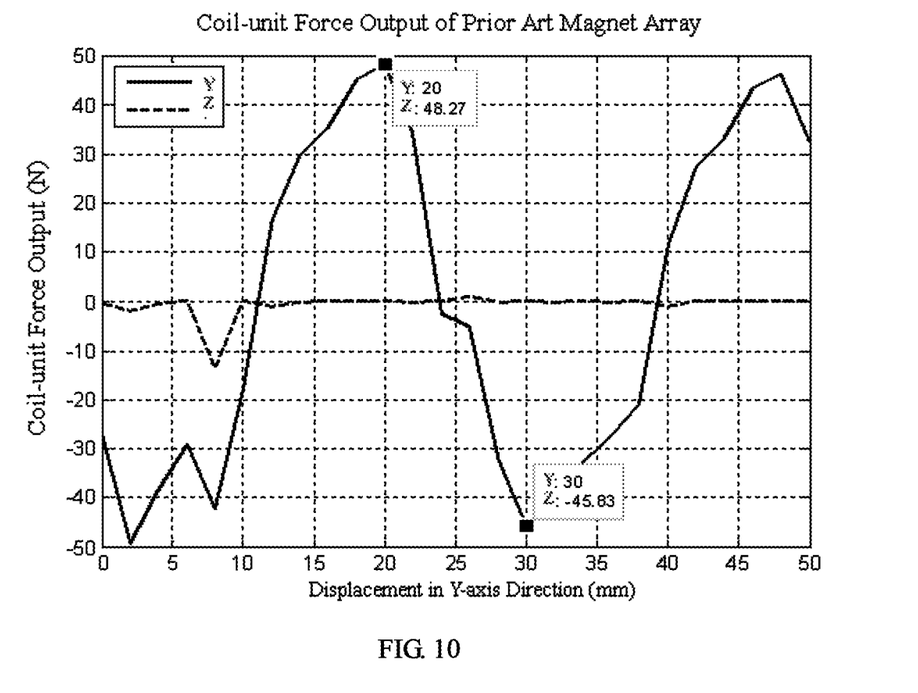
FIG. 10 shows the coil-unit force output of the magnet array of FIG. 8.
Figure 11:
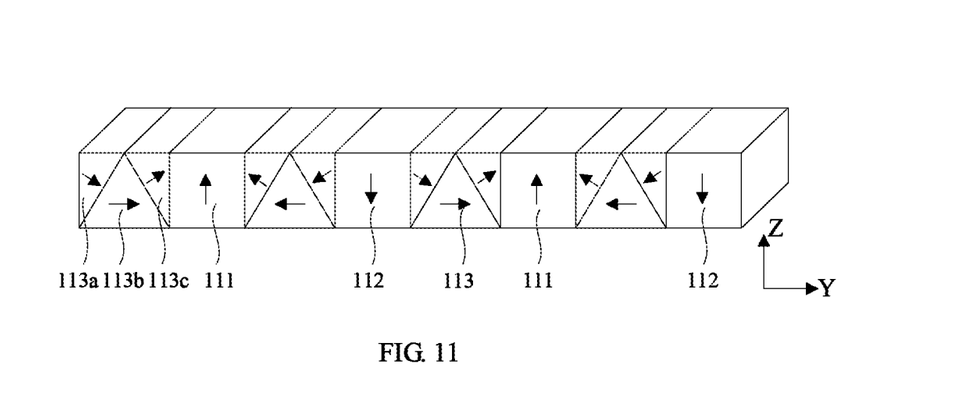
FIG. 11 is a three-dimensional schematic view of a magnet array used in the linear motor of FIG. 2.
Figure 12:
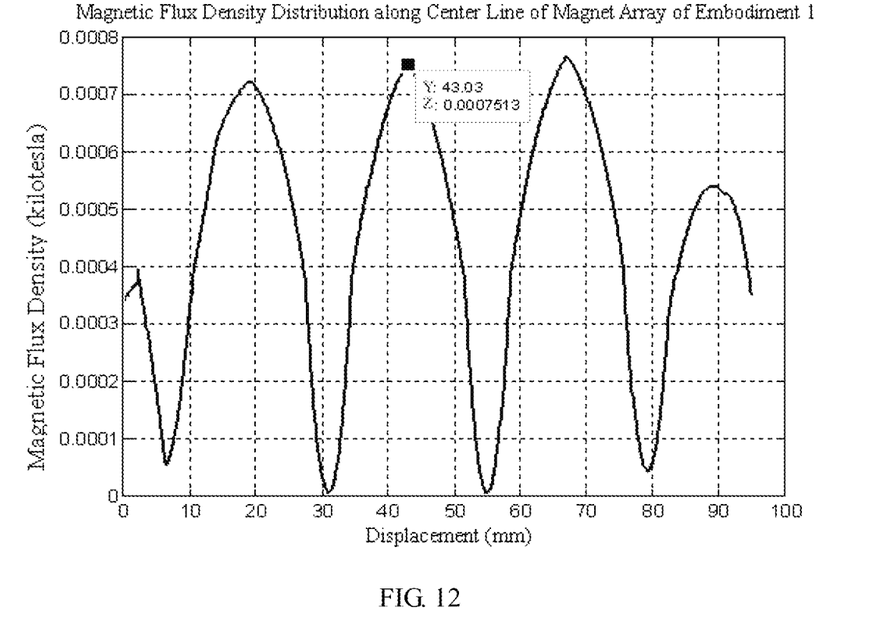
FIG. 12 shows a magnetic flux density distribution along a center line of the magnet array in accordance with embodiment 1 of the present invention.
Figure 13:
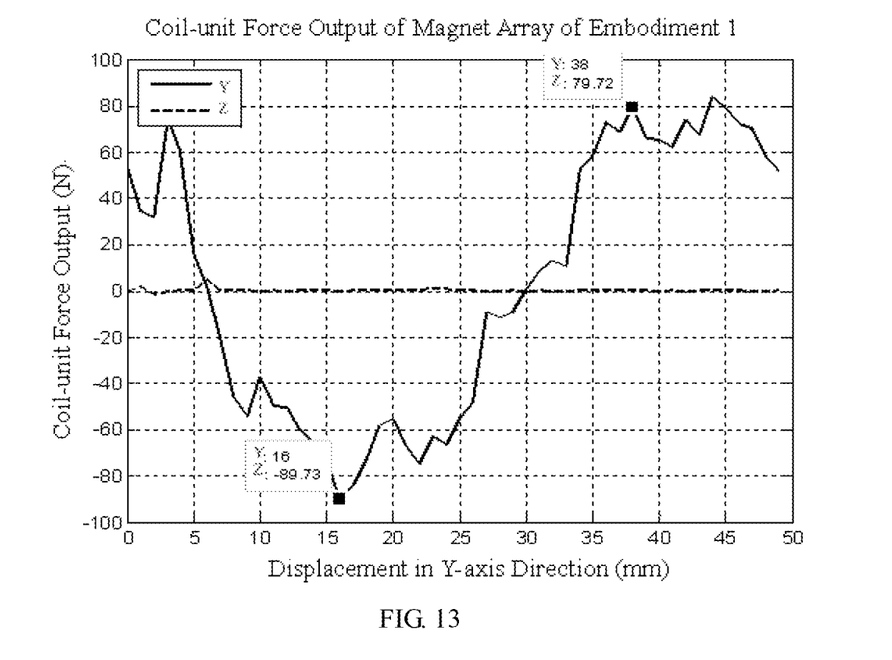
FIG. 13 shows the coil-unit force output of the magnet array in accordance with embodiment 1 of the present invention.

Referring to FIGS. 8 to 13, in which, FIG. 8 is a three-dimensional schematic view of a conventional magnet array; FIG. 9 shows a magnetic flux density distribution along a center line of the magnet array of FIG. 8; FIG. 10 shows the coil-unit force output of the magnet array of FIG. 1; FIG. 11 is a three-dimensional schematic view of a magnet array used in the linear motor of FIG. 2; FIG. 12 shows a magnetic flux density distribution along a center line of the Halbach array in accordance with embodiment 1 of the present invention; and FIG. 13 shows the coil-unit force output of the magnet array in accordance with embodiment 1 of the present invention.

By comparing FIG. 9 and FIG. 12 we can see that, a maximum magnetic flux density created by the conventional Halbach array is 0.00036 kiloteslas; a maximum magnetic flux density of the Halbach array in accordance with embodiment 1 of the present invention is 0.00075 kiloteslas, and the magnetic flux density distribution more resembles a standard sinusoid. By comparing FIG. 10 and FIG. 13 we can see that, the coil-unit force output of the conventional Halbach array is in the range of −45.83 N~48.27 N, and the coil-unit force output of the Halbach array in accordance with embodiment 1 of the present invention is −89.73 N~79.72 N. These results demonstrate an improvement of the Halbach array in accordance with embodiment 1 of the present invention both in maximum magnetic flux density and in force output over the prior art.

Embodiment 2

Figure 14:
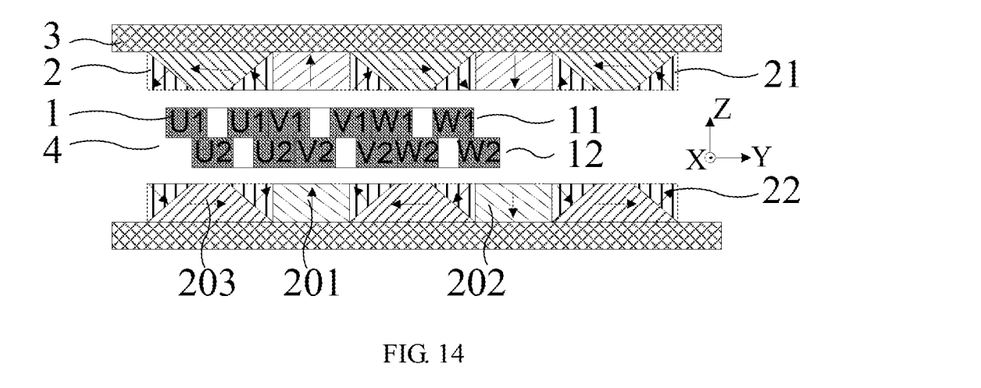
FIG. 14 is a schematic showing a linear motor constructed in accordance with embodiment 2 of the present invention.

Referring to FIG. 14, this embodiment differs from embodiment 1 in that:

the first, second and third prismatic magnets 203a, 203b and 203c have cross sections in the Y-Z plane in the shapes of a right triangle, an isosceles trapezoid and a right triangle, respectively. Each of the first and second magnet arrays 21 and 22 is composed of third-type magnets 203 of the above-mentioned structure, first-type magnets 201, and second-type magnets 202. The linear motor of this embodiment offers the same advantages of: generating a desirable vertical levitation force; providing a desirable control moment with ripple force that may be caused by tilt or other factors being canceled out to eliminate any torsional moment, thus achieving precision positioning; creating an augmented vertical magnetic flux and hence increased horizontal driving force; and having less magnetic flux. leakage.

Embodiment 3

Figure 15:
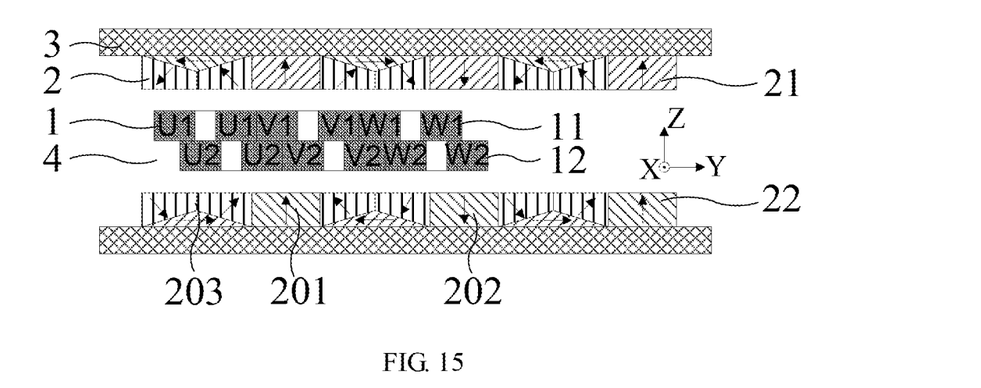
FIG. 15 is a schematic showing a linear motor constructed in accordance with embodiment 3 of the present invention.

Referring to FIG. 15, this embodiment differs from embodiment 1 in that: the first, second and third prismatic magnets 203a, 203b and 203c have cross sections in the Y-Z plane in the shapes of a right trapezoid, an isosceles triangle and a right trapezoid, respectively, and the two right trapezoids share a common side. The first and second magnet arrays 21 and 22, each composed of the third-type magnets 203 of the above-mentioned structure, first-type magnets 201 and second-type magnets 202, also have the advantage of less magnetic flux leakage. The linear motor of this embodiment also offers the same advantages of: generating a desirable vertical levitation force; providing a desirable control moment with ripple force that may be caused by tilt or other factors being canceled out to eliminate any torsional moment, thus achieving precision positioning; creating an augmented vertical magnetic flux and hence increased horizontal driving force; and having less magnetic flux leakage.

Embodiment 4

Figure 16:
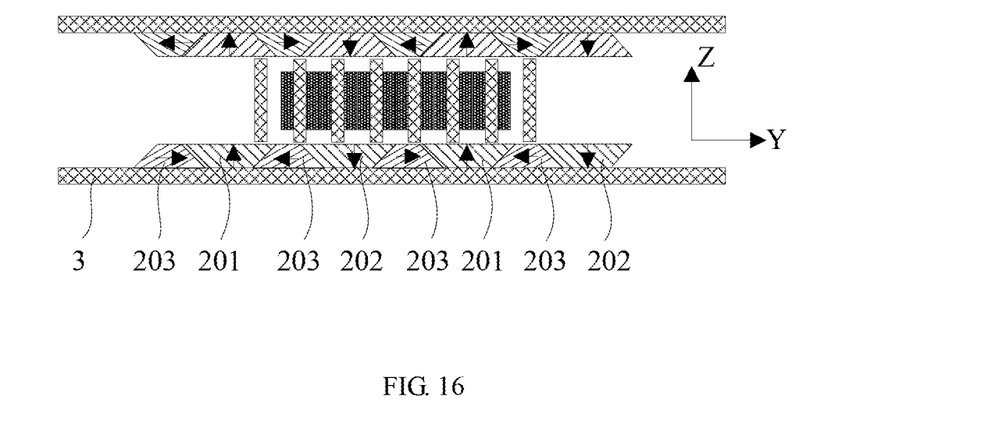
FIG. 16 is a schematic showing a linear motor constructed in accordance with embodiment 4 of the present invention.

Referring to FIG. 16, this embodiment differs from embodiment 1 in that: each of the third-type magnets is a one-piece unitary prismatic magnet and each of the first-type, second-type and third-type magnets has a cross section in the Y-Z plane in the shape of an isosceles trapezoid. Accordingly, each of the first-type and second-type magnets has a magnetization direction that is parallel to the Z-axis direction; the magnetization direction of each of the first-type magnets is opposite to the magnetization direction of each of the second-type magnets; and each of the third-type magnets has a magnetization direction that is parallel to the Y-axis direction and points toward the adjacent first-type or second-type magnet. As such, each set of a third-type magnet and the adjacent first-type and second-type magnets, of one magnet array, jointly forms a closed magnetic circuit with a corresponding set of the other symmetrical magnet array. Further, the cross sections of the first-type, second-type and third-type magnets in the Y-Z plane may be isosceles trapezoids that have the same length of the slant sides, the same base angle and the same height. The first and second magnet arrays 21 and 22, each composed of the third-type magnets 203, first-type magnets 201 and second-type magnets 202 of the above-mentioned structures, also have the advantages of generating a desirable vertical levitation force; providing a desirable control moment with ripple force that may be caused by tilt or other factors being canceled out to eliminate any torsional moment, thus achieving precision positioning; creating an augmented vertical magnetic flux and hence increased horizontal driving force; and having less magnetic flux leakage.

Embodiment 5

Figure 17:
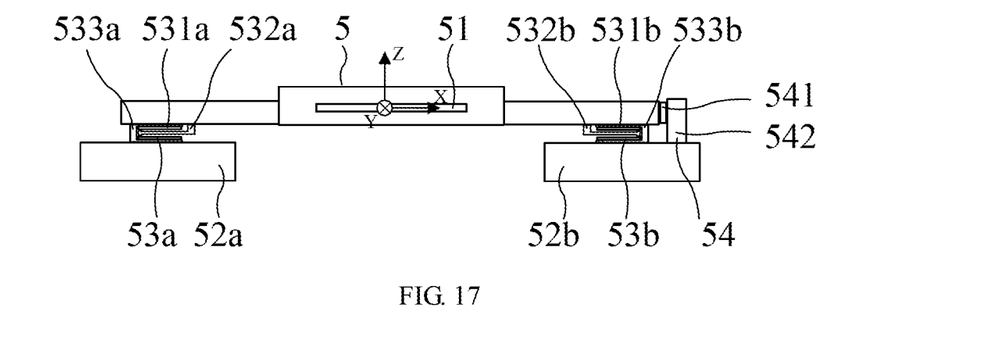
FIG. 17 depicts a front view of a stage apparatus incorporating linear motors that embody the present invention.
Figure 18:
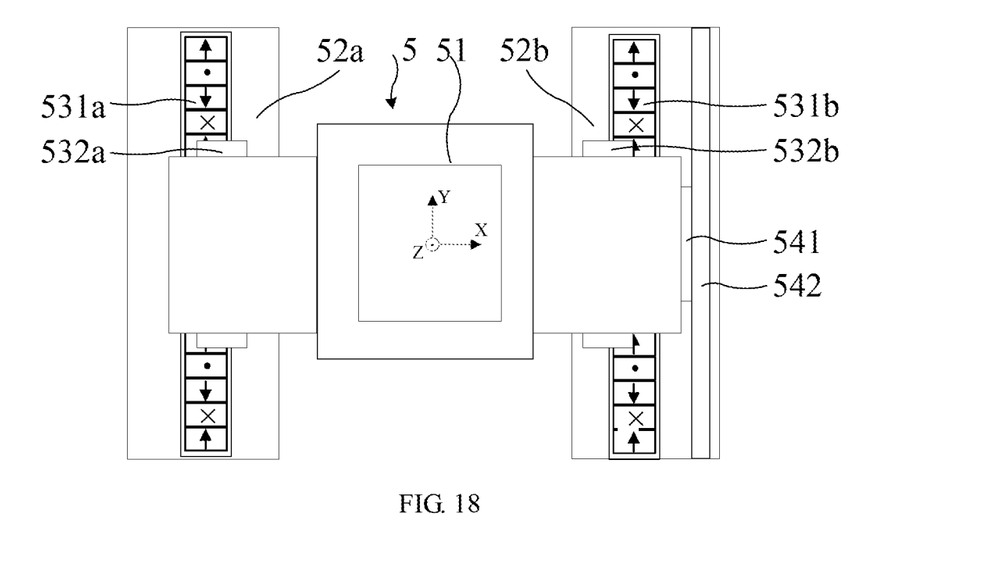
FIG. 18 is a top view of FIG. 17 (in which, of the linear motors, only the coil units and the bottom-layered second magnet arrays are shown).

Referring to FIGS. 17 and 18, this embodiment provides a stage apparatus 5 which includes a stage 51 and two support legs 52a and 52b disposed on opposing ends of the stage 51. The stage 51 is provided with a driving force in the Y-axis direction and a levitation force in the Z-axis direction from motors 53a and 53b arranged on tops of the respective support legs 52a and 52b. The motor 53a includes a magnet fixing member 533a, a magnet unit 531a and a coil unit 532a. The motor 53b includes a magnet fixing member 533b, a magnet unit 531b and a coil unit 532b. Each of the motors 53a and 53b is implemented as one of the above-mentioned linear motors (including the linear motors described in embodiments 1, 2 and 3). By employing the linear motor of the invention, the stage apparatus not only obtains all the benefits thereof, but also capable of providing a driving force in a certain horizontal direction and a vertical levitation force (in the Z-axis direction), with a simple structure not including any air levitation mechanism, as well as easy operations.

Preferably, in the stage apparatus of this embodiment, at least one of the support legs 52a and 52b is provided on top thereof with a guide means 54 for providing guidance for the movement of the stage 51 in the Y-axis direction, and the guide means 54 includes: an air slide 541 coupled to the stage 51 and a guide rail 542 secured to the support leg 52a and/or the support leg 52b. The air slide 541 is disposed on a side of the guide rail 542 facing toward the stage 51. Preferably, the air slide 541 of the stage apparatus in this embodiment is a flexible block. The air slide 541 and the guide rail 542 constitute an air track which takes the advantage of the working mechanism of air bearings to enable friction-free, vibration-free sliding movement. It has many advantages, such as high movement precision, cleanness and non-pollution, and capability of error equalization which allows a high guide precision resulting from a relatively low manufacture precision.

In operation, an electrical current is introduced in the coil units 532a and 532b disposed between the magnet units 531a and 531b, and thereby causes the coil units 532a and 532b to generate a driving force along the Y-axis direction, a levitation force in the Z-axis direction that is perpendicular to the Y-axis direction, and a control moment about the X-axis direction.

As described above, in the linear motor and stage apparatus of this invention, the coil unit includes a first coil array and a second coil array which are arranged in a stacked manner in the Z-axis direction and the first coil array and the second coil array are staggered from each other by a distance of $\Delta P$ in the Y-axis direction, and $\Delta P$ is so set that in the event that the coil unit is provided with a prescribed electrical current from a control system, the coil unit generates a control force along the Y-axis direction, another control force along the Z-axis direction, and a moment about the X-axis direction. On one hand, arranging the first and second coil arrays into two separate layers enables the generation of a desirable vertical levitation force, and on the other hand, staggering the two layers of the coil arrays by a certain distance from each other can provide a desirable control moment with ripple force that may be caused by tilt or other factors being canceled out to eliminate any torsional moment, thus achieving precision positioning. Further, by incorporating the linear motor, the stage apparatus is capable of providing a driving force in a certain horizontal direction and a vertical levitation force, with a simple structure not including any air levitation mechanism, as well as easy operations.

Additionally, in the linear motor and stage apparatus of this invention, each of the first and second magnet arrays is composed of first-type magnets, second-type magnets and third-type magnets arranged along the Y-axis direction in a similar periodically alternating manner of a Halbach array, wherein each of the third-type magnets is interposed between a corresponding one of the first-type magnets and an adjacent one of the second-type magnets; the first-type and second-type magnets are arranged along the Y-axis direction in an alternating and equidistant manner; each of the third-type magnets is a one-piece unitary prismatic magnet or includes three prismatic magnets, where in the former case, each adjacent pair of magnets of different types has oblique abutting side faces, and in the latter case, each adjacent pair of the prismatic magnets of each of the third-type magnets has oblique abutting side faces; and each set of a third-type magnet and the adjacent first-type magnet and second-type magnet, of one magnet array, jointly forms a closed magnetic circuit with a corresponding set of the other symmetrical magnet array. Compared to the conventional NS array with a uniform magnetic energy product, the Halbach topology in which the first and second magnet arrays are both arranged into a similar periodically alternating configuration as that of a Halbach array enables the magnet unit to have an augmented vertical magnetic flux and hence increased horizontal magnetic flux density and driving force, as well as an augmented horizontal magnetic flux and hence increased vertical magnetic flux density and driving force. This allows the motor to generate higher driving forces in six degrees of freedom. Further, the use of prismatic magnets, for example, triangular or quadrangular prismatic magnets, in the magnet arrays enables the construction of a Halbach array with less magnetic flux leakage, more uniform spatial flux density distribution, reduced high-order harmonic amplitude in in-plane flux density and a smaller mass, compared to the conventional magnet arrays.

Obviously, those skilled in the art may make various modifications and alterations without departing from the spirit and scope of the invention. It is therefore intended that the invention be construed as including all such modifications and alterations insofar as they fall within the scope. of the appended claims or equivalents thereof.

What is claimed is:

1. A linear motor comprising a magnet unit and a coil unit, the magnet unit comprising a first magnet array and a second magnet array arranged on a magnetic yoke, symmetrically and in parallel to each other, the coil unit being disposed in a magnetic gap formed between the first and second magnet arrays, wherein in a spatial rectangular coordinate system defined by X, Y and Z axes, the coil unit comprises a first coil array and a second coil array arranged in a stacked manner in the Z-axis direction and the first and second coil arrays are staggered from each other by a distance of $\Delta P$ in the Y-axis direction, and $\Delta P$ is so set that when the coil unit is provided with a desired electrical current from a control system, the coil unit generates a first control force along the Y-axis direction, a second control force along the Z-axis direction, and a moment about the X-axis direction, wherein each of the first and second magnet arrays is composed of first-type magnets, second-type magnets and third-type magnets arranged along the Y-axis direction in a similar periodically alternating manner of a Halbach array, each of the third-type magnets being interposed between a corresponding one of the first-type magnets and an adjacent one of the second-type magnets, wherein the first-type magnets and second-type magnets are arranged along the Y-axis direction in an alternating and equidistant manner, wherein each of the third-type magnets is a one-piece unitary prismatic magnet or comprises three prismatic magnets, when each of the third-type magnets is a one-piece unitary prismatic magnet, each pair of adjacent magnets has oblique abutting side faces, and when each of the third-type magnets comprises three prismatic magnets, each pair of adjacent ones of the three prismatic magnets has oblique abutting side faces, and wherein each set of one of the third-type magnets, the adjacent one of the first-type magnets and the adjacent one of the second-type magnets, of one of the first and second magnet arrays, jointly forms a closed magnetic circuit with a corresponding set of the other symmetrical one of the first and second magnet arrays.

2. The linear motor of claim 1, wherein the first and second coil arrays comprises a same number of coils each having a coil pitch of CP, where the number is greater than two, and wherein in the Y-axis direction, the first coil array is staggered from the second coil array by a distance of $\Delta P$ that equals to ¼ CP.

3. The linear motor of claim 1, wherein each of the first-type and second-type magnets assumes a shape of a cuboid, wherein each of the first-type and second-type magnets has a magnetization direction parallel to the Z-axis direction, and the magnetization direction of each of the first-type magnets is opposite to the magnetization direction of each of the second-type magnets, wherein each of the third-type magnets includes a first prismatic magnet, a second prismatic magnet and a third prismatic magnet, and the three prismatic magnets are able to form, as a whole, a cuboid that has a same height as the first-type and second-type magnets, wherein each of the first, second and third prismatic magnets is in a shape of a triangular or quadrangular prism; and wherein a path along magnetization directions of the first, second and third prismatic magnets advances, from the first prismatic magnet, through the abutting faces of the first and second prismatic magnets, into the second prismatic magnet, further through the abutting faces of the second and third prismatic magnets and further into the third prismatic magnet, or reversely, from the third prismatic magnet, through the abutting faces of the third and second prismatic magnets, into the second prismatic magnet, further through the abutting faces of the second and first prismatic magnets and further into the first prismatic magnet, so that each set of one of the third-type magnets, the adjacent one of the first-type magnets and the adjacent one of the second-type magnets, of one of the first and second magnet arrays, jointly forms a closed magnetic circuit with a corresponding set of the other symmetrical one of the first and second magnet arrays.

4. The linear motor of claim 3, wherein the first, second and third prismatic magnets have cross sections in a Y-Z plane in shapes of a right triangle, an isosceles triangle and a right triangle, respectively, or the first, second and third prismatic magnets have cross sections in the Y-Z plane in shapes of a right trapezoid, an isosceles triangle and a right trapezoid, respectively.

5. The linear motor of claim 4, wherein each of the first-type magnets has the same lengthwise and widthwise dimensions with each of the second-type magnets, and the first-type, second-type and third-type magnets all have the same height.

6. The linear motor of claim 3, wherein the first, second and third prismatic magnets have cross sections in a Y-Z plane in shapes of a right trapezoid, an isosceles triangle and a right trapezoid, respectively.

7. The linear motor of claim 6, wherein the cross sections of the first and third prismatic magnets have cross sections in the Y-Z plane in shapes of right trapezoids sharing a common side.

8. The linear motor of claim 1, wherein angles of the abutting side faces with respect to the Z axis are determined by sizes and shapes of the first, second and third prismatic magnets.

9. The linear motor of claim 1, wherein each of the third-type magnets is a one-piece unitary prismatic magnet, and each of the first-type, second-type and third-type magnets has a cross section in a Y-Z plane in a shape of an isosceles trapezoid, wherein each of the first-type and second-type magnets has a magnetization direction parallel to the Z-axis direction, and the magnetization direction of each of the first-type magnets is opposite to the magnetization direction of each of the second-type magnets, and wherein each of the third-type magnets has a magnetization direction parallel to the Y-axis direction and points toward the adjacent first-type or second-type magnet, so that each set of one of the third-type magnets, the adjacent one of the first-type magnets and the adjacent one of the second-type magnets, of one of the first and second magnet arrays, jointly forms a closed magnetic circuit with a corresponding set of the other symmetrical one of the first and second magnet arrays.

10. The linear motor of claim 9, wherein cross sections of the first-type, second-type and third-type magnets in the Y-Z plane are isosceles trapezoids having a same length of slant sides, a same base angle and a same height.

11. A stage apparatus, comprising a stage and two support legs disposed on opposing ends of the stage, wherein the stage is provided with a driving force in a Y-axis direction and a levitation force in a Z-axis direction from motors arranged on tops of the respective support legs, wherein each of the motors comprises a magnet unit and a coil unit, the magnet unit comprising a first magnet array and a second magnet array arranged on a magnetic yoke, symmetrically and in parallel to each other, the coil unit being disposed in a magnetic gap formed between the first and second magnet arrays, wherein in a spatial rectangular coordinate system defined by X, Y and Z axes, the coil unit comprises a first coil array and a second coil array arranged in a stacked manner in the Z-axis direction and the first and second coil arrays are staggered from each other by a distance of $\Delta P$ in the Y-axis direction, and $\Delta P$ is so set that when the coil unit is provided with a desired electrical current from a control system, the coil unit generates a first control force along the Y-axis direction, a second control force along the Z-axis direction, and a moment about the X-axis direction, wherein each of the first and second magnet arrays is composed of first-type magnets, second-type magnets and third-type magnets arranged along the Y-axis direction in a similar periodically alternating manner of a Halbach array, each of the third-type magnets being interposed between a corresponding one of the first-type magnets and an adjacent one of the second-type magnets, wherein the first-type magnets and second-type magnets are arranged along the Y-axis direction in an alternating and equidistant manner, wherein each of the third-type magnets is a one-piece unitary prismatic magnet or comprises three prismatic magnets, when each of the third-type magnets is a one-piece unitary prismatic magnet, each pair of adjacent magnets has oblique abutting side faces, and when each of the third-type magnets comprises three prismatic magnets, each pair of adjacent ones of the three prismatic magnets has oblique abutting side faces, and wherein each set of one of the third-type magnets, the adjacent one of the first-type magnets and the adjacent one of the second-type magnets, of one of the first and second magnet arrays, jointly forms a closed magnetic circuit with a corresponding set of the other symmetrical one of the first and second magnet arrays.

12. The stage apparatus of claim 11, wherein at least one of the support legs is provided on top thereof with a guide means for providing guidance for movement of the stage in the Y-axis direction, and wherein the guide means comprises: an air slide coupled to the stage and a guide rail secured to at least one of the support legs, the air slide being disposed on a side of the guide rail facing toward the stage.

13. The stage apparatus of claim 12, wherein the air slide is a flexible block.

14. The stage apparatus of claim 11, wherein the first and second coil arrays comprises a same number of coils each having a coil pitch of CP, where the number is greater than two, and wherein in the Y-axis direction, the first coil array is staggered from the second coil array by a distance of $\Delta P$ that equals to ¼ CP.

15. The stage apparatus of claim 11, wherein each of the first-type and second-type magnets assumes a shape of a cuboid, wherein each of the first-type and second-type magnets has a magnetization direction parallel to the Z-axis direction, and the magnetization direction of each of the first-type magnets is opposite to the magnetization direction of each of the second-type magnets, wherein each of the third-type magnets includes a first prismatic magnet, a second prismatic magnet and a third prismatic magnet, and the three prismatic magnets are able to form, as a whole, a cuboid that has a same height as the first-type and second-type magnets, wherein each of the first, second and third prismatic magnets is in a shape of a triangular or quadrangular prism; and wherein a path along magnetization directions of the first, second and third prismatic magnets advances, from the first prismatic magnet, through the abutting faces of the first and second prismatic magnets, into the second prismatic magnet, further through the abutting faces of the second and third prismatic magnets and further into the third prismatic magnet, or reversely, from the third prismatic magnet, through the abutting faces of the third and second prismatic magnets, into the second prismatic magnet, further through the abutting faces of the second and first prismatic magnets and further into the first prismatic magnet, so that each set of one of the third-type magnets, the adjacent one of the first-type magnets and the adjacent one of the second-type magnets, of one of the first and second magnet arrays, jointly forms a closed magnetic circuit with a corresponding set of the other symmetrical one of the first and second magnet arrays.

16. The stage apparatus of claim 15, wherein the first, second and third prismatic magnets have cross sections in a Y-Z plane in shapes of a right triangle, an isosceles triangle and a right triangle, respectively, or the first, second and third prismatic magnets have cross sections in the Y-Z plane in shapes of a right trapezoid, an isosceles triangle and a right trapezoid, respectively.

17. The stage apparatus of claim 16, wherein each of the first-type magnets has the same lengthwise and widthwise dimensions with each of the second-type magnets, and the first-type, second-type and third-type magnets all have the same height.

18. The stage apparatus of claim 15, wherein the first, second and third prismatic magnets have cross sections in a Y-Z plane in shapes of a right trapezoid, an isosceles triangle and a right trapezoid, respectively; wherein the cross sections of the first and third prismatic magnets have cross sections in the Y-Z plane in shapes of right trapezoids sharing a common side.

* * * * *